US008321248B2

(12) United States Patent
Cobb et al.

(10) Patent No.: US 8,321,248 B2
(45) Date of Patent: Nov. 27, 2012

(54) METHOD, SYSTEM AND PROGRAM PRODUCT FOR RENDERING STATE DIAGRAMS FOR A MULTI-DIMENSIONAL ENTERPRISE ARCHITECTURE

(75) Inventors: Glenn A. Cobb, Lansing, NY (US); Richard W. Page, Jr., Lansing, NY (US); Kevin W. Young, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 1688 days.

(21) Appl. No.: 10/741,404

(22) Filed: Dec. 19, 2003

(65) Prior Publication Data
US 2005/0137718 A1 Jun. 23, 2005

(51) Int. Cl.
*G06F 17/50* (2006.01)
*G06F 9/44* (2006.01)
*G06Q 10/00* (2006.01)
(52) U.S. Cl. ........................................ 705/7.11; 705/1.1
(58) Field of Classification Search ............... 705/1, 1.1, 705/7
See application file for complete search history.

(56) References Cited

U.S. PATENT DOCUMENTS

| 6,002,409 | A | 12/1999 | Harkin |
| 6,191,787 | B1 | 2/2001 | Lu et al. |
| 7,000,190 | B2 * | 2/2006 | Kudukoli et al. ............. 715/763 |
| 2001/0056437 | A1 * | 12/2001 | Allen et al. ................... 707/203 |
| 2002/0032590 | A1 | 3/2002 | Anand et al. |
| 2003/0052919 | A1 | 3/2003 | Tlaskal et al. |
| 2004/0083448 | A1 * | 4/2004 | Schulz et al. ................. 717/101 |
| 2004/0162741 | A1 * | 8/2004 | Flaxer et al. ..................... 705/7 |
| 2004/0205179 | A1 * | 10/2004 | Hunt et al. .................... 709/223 |

* cited by examiner

*Primary Examiner* — Jonathan Ouellette
(74) *Attorney, Agent, or Firm* — Anna L. Linne; Hoffman Warnick LLC (57) ABSTRACT

The present provides a method, system, and program product for rendering state diagrams for a multi-dimensional enterprise architecture. The rendered state diagrams illustrate the actual or planned use, assignment, retirement, interdependence, etc., of enterprise elements in a multi-dimensional enterprise architecture within a user-specified time frame, from a user selected frame of reference, for a user-specified business scope. The method comprises: defining a plurality of objects, wherein each of the objects represents an element of the enterprise architecture; defining a plurality of relationships, wherein each of the relationships is between one of the plurality of objects and another of the plurality of objects; and rendering the at least one state diagram based upon the plurality of objects, the plurality of relationships, and a frame of reference.

25 Claims, 10 Drawing Sheets

METHOD, SYSTEM AND PROGRAM PRODUCT FOR RENDERING STATE DIAGRAMS FOR A MULTI-DIMENSIONAL ENTERPRISE ARCHITECTURE

FIELD OF THE INVENTION

The present invention relates in general to an enterprise architecture. More particularly, the present provides a method, system, and program product for rendering state diagrams for a multi-dimensional enterprise architecture. The rendered state diagrams illustrate the actual or planned use, assignment, retirement, interdependence, etc., of enterprise elements in a multi-dimensional enterprise architecture within a user-specified time frame, from a user selected frame of reference, for a user-specified business scope.

BACKGROUND OF THE INVENTION

Organizations driving to enable rapid response, create a competitive gap, grow top-line revenue and reduce operating costs are evolving to e-business on demand. The journey to e-business on demand requires both long-term vision and a roadmap with incremental milestones and returns that can be measured during business transformation. These milestones and returns are achieved by understanding, focusing, integrating, and streamlining the elements composing the enterprise and its value net.

A comprehensive management environment is required to enable the optimal alignment of the elements of a business architecture (capabilities, strategies, organization, structures, processes, data), and the technical architecture (application software, system software, physical data storage, infrastructure, and hardware) throughout the journey. One technique for facilitating and implementing such a comprehensive management environment is through the use of an enterprise architecture.

Figure 1:
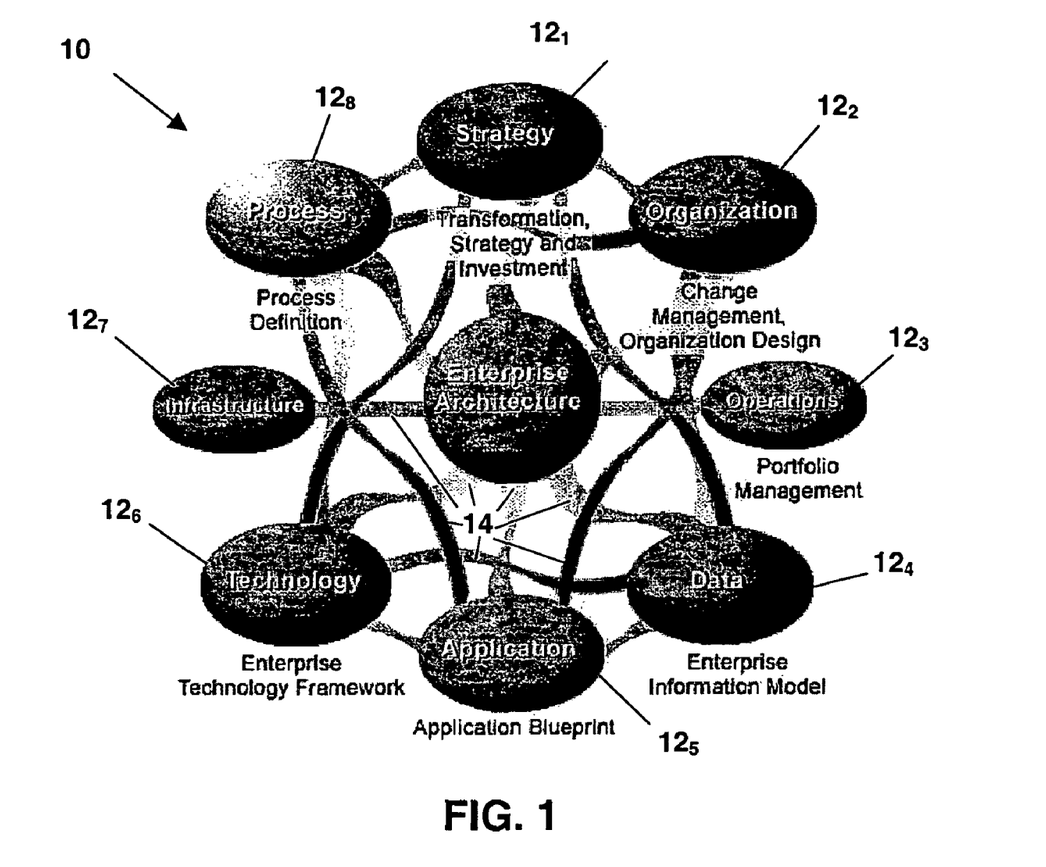
FIG. 1 depicts a general view of an enterprise architecture.

An enterprise architecture is an integrating framework comprising all the structural, procedural, computing, communications, and technical information about an organization and its systems, operations, and facilities. A diagram illustrating the structure of an exemplary enterprise architecture 10 is shown in FIG. 1. In particular, FIG. 1 illustrates a general view of an enterprise architecture 10 comprising eight domains, including strategy $12_1$, organization $12_2$, operations $12_3$, data $12_4$, application $12_5$, technology $12_6$, infrastructure $12_7$, and process $12_8$. As shown symbolically by the plurality of interleaved lines 14, many of the enterprise elements within a given domain $12_1$-$12_8$ are often used by, or assigned to, enterprise elements located in other domains $12_1$-$12_8$. To this extent, as the enterprise architecture 10 changes with time to accommodate changes in business, various enterprise elements will also change to reflect these changes. Unfortunately, as such changes occur, it is often difficult to determine what effect, if any, such changes will have on the other domains in the enterprise architecture, especially over time. For example, resources added to improve one aspect of a business might actually have an unforeseen adverse effect on existing resources that are designed to aid another aspect of the business.

Although there are tools available today that support the creation of an enterprise architecture, none of these tools are capable of rendering layered state diagrams to illustrate the actual or planned use, assignment, retirement, interdependence, etc., of enterprise elements across domains in an enterprise architecture. Further, none of these tools are capable of rendering such layered state diagrams during a user-specified time frame from a user selected frame of reference (e.g., a domain within the enterprise architecture) for a user-specified business scope (e.g., business strategy, information technology (IT), etc.). Such a capability would greatly enhance the value of an enterprise architecture, especially for use in a business that changes frequently (e.g., an e-business on demand).

SUMMARY OF THE INVENTION

The present invention provides a method, system, and program product for rendering state diagrams for a multi-dimensional enterprise architecture. The rendered state diagrams illustrate the actual or planned use, assignment, retirement, interdependence, etc., of enterprise elements in a multi-dimensional enterprise architecture within a user-specified time frame, from a user selected frame of reference, for a user-specified business scope.

A first aspect of the present invention provides a method for rendering at least one state diagram for an enterprise architecture, comprising: defining a plurality of objects, wherein each of the objects represents an enterprise element of the enterprise architecture; defining a plurality of relationships, wherein each of the relationships is between one of the plurality of objects and another of the plurality of objects; and rendering the at least one state diagram based upon the plurality of objects, the plurality of relationships, and a frame of reference.

A second aspect of the present invention provides a system for rendering at least one state diagram for an enterprise architecture, comprising: a system for defining a plurality of objects, wherein each of the objects represents an element of the enterprise architecture; a system for defining a plurality of relationships, wherein each of the relationships is between one of the plurality of objects and another of the plurality of objects; and a system for rendering the at least one state diagram based upon the plurality of objects, the plurality of relationships, and a frame of reference.

A third aspect of the present invention provides a program product stored on a recordable medium for rendering at least one state diagram for an enterprise architecture, which when executed, comprises: program code for defining a plurality of objects, wherein each of the objects represents an element of the enterprise architecture; program code for defining a plurality of relationships, wherein each of the relationships is between one of the plurality of objects and another of the plurality of objects; and program code for rendering the at least one state diagram based upon the plurality of objects, the plurality of relationships, and a frame of reference.

Therefore, the present invention provides a method, system, and program product for rendering state diagrams for a multi-dimensional enterprise architecture.

BRIEF DESCRIPTION OF THE DRAWINGS

These and other features of this invention will be more readily understood from the following detailed description of the various aspects of the invention taken in conjunction with the accompanying drawings in which.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

As indicated above, the present invention provides a method, system, and program product for rendering state diagrams for a multi-dimensional enterprise architecture. The rendered state diagrams illustrate the actual or planned use, assignment, retirement, interdependence, etc., of enterprise elements in a multi-dimensional enterprise architecture within a user-specified time frame, from a user selected frame of reference, for a user-specified business scope.

In the following description of the present invention, it is assumed that the reader has a general understanding of enterprise architecture. Accordingly, a detailed description of enterprise architecture is not provided.

Figure 2:
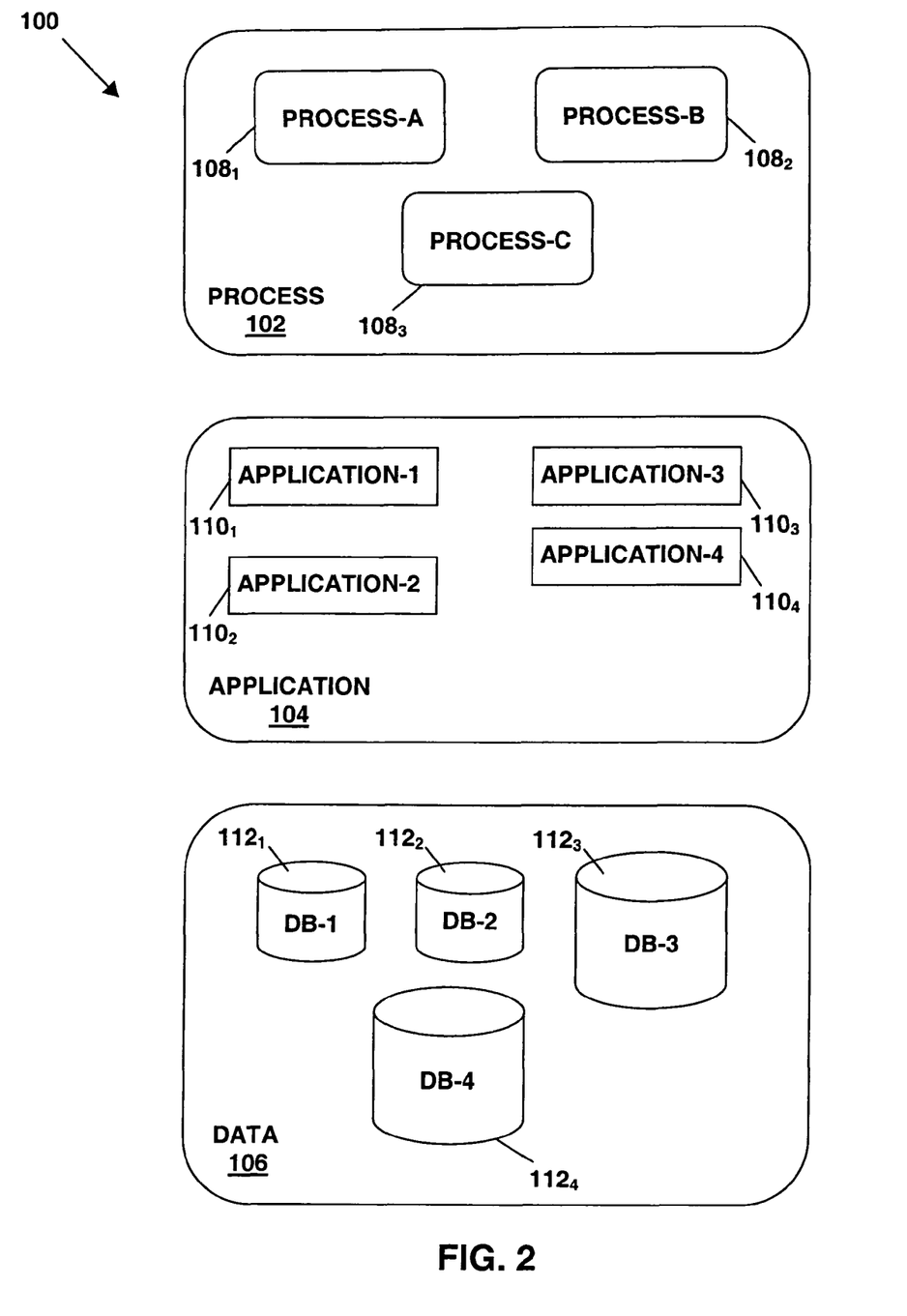
FIG. 2 depicts a simple, illustrative enterprise architecture including three domains.

An enterprise architecture 100 comprising three domains, including PROCESS 102, APPLICATION 104, and DATA 106, is illustrated in FIG. 2. Although enterprise architecture 100 is shown for simplicity of description as including only three domains, each having a limited number of enterprise elements, it should be clear to one skilled in the art that the present invention can be applied to an enterprise architecture having any number of domains/elements. It should also be noted that a given domain, such as PROCESS 102 may have one or more layers, or levels of process elements, which can be affected all or in part by a change to other domain objects or elements. Further, although the present invention will be described below in terms of enterprise architecture 100, it should be clear to one skilled in the art that the present invention may be applied at any stage of the design, development and modeling of an enterprise architecture.

In accordance with the present invention, a modeling tool is provided that allows a user to define the enterprise elements in one or more domains of an enterprise architecture, and to define intra and inter-domain relationships between selected enterprise elements in the domains. An intra-domain relationship may include, for example, an assignment of an enterprise element to, or the use of an enterprise element in support of, one or more other enterprise elements in the same domain. An inter-domain relationship may include, for example, an assignment of an enterprise element to, or the use of an enterprise element in support of, one or more enterprise elements in one or more other domains of the enterprise architecture. Other intra and inter-domain relationships are also possible.

The modeling tool of the present invention interrogates the user regarding planned effective dates (e.g., begin and end dates) and actual effective dates (e.g., begin and end dates) for the use of an enterprise element in support of another enterprise element in the same and/or other domain(s). In addition, the modeling tool interrogates the user regarding planned effective dates and actual effective dates for the assignment of an enterprise element to another enterprise element in the same and/or other domain(s).

Based on the defined intra and inter-domain relationships, and the planned and actual effective dates, the modeling tool renders at least one user selected state diagram that illustrates the actual or planned use, assignment, retirement, interdependence, etc., of enterprise elements in the enterprise architecture within a user-specified time frame, from a user selected frame of reference, and for a user-specified business scope. A state diagram may be "layered" to contain enterprise elements from multiple domains of the enterprise architecture. The enterprise elements and assignments are represented by objects and assignment symbols within the state diagram.

In FIG. 2, a plurality of elements have been defined by a user for each domain 102, 104, 106 of enterprise architecture 100, and have been displayed as objects within the respective domains by the modeling tool of the present invention. Specifically, PROCESS domain 102 is defined as including three process elements represented by objects PROCESS-A $108_1$, PROCESS-B $108_2$, and PROCESS-C $108_3$. In this example, the object shape of each process object $108_1$-$108_3$ within the PROCESS domain 102 is depicted as a rectangle with rounded corners. Of course, process objects $108_1$-$108_3$ (as well as other objects described below) may have other object shapes and/or attributes (e.g., shading, color, size, etc.) that uniquely identify the domain to which they belong.

In a similar manner, APPLICATION domain 104 is defined as including four application elements represented by objects APPLICATION-1 $110_1$, APPLICATION-2 $110_2$, APPLICATION-3 $110_3$, and APPLICATION-4 $110_4$. The object shape of each application object $110_1$-$110_4$ within the APPLICATION domain 104 is depicted as a rectangle. Further, DATA domain 106 is defined as comprising four data elements represented by objects DB-1 $112_1$, DB-2 $112_2$, DB-3 $112_3$, and DB-4 $112_4$. The object shape of each data object $112_1$-$112_4$ within the DATA domain 106 is depicted as a cylinder.

Figure 3:
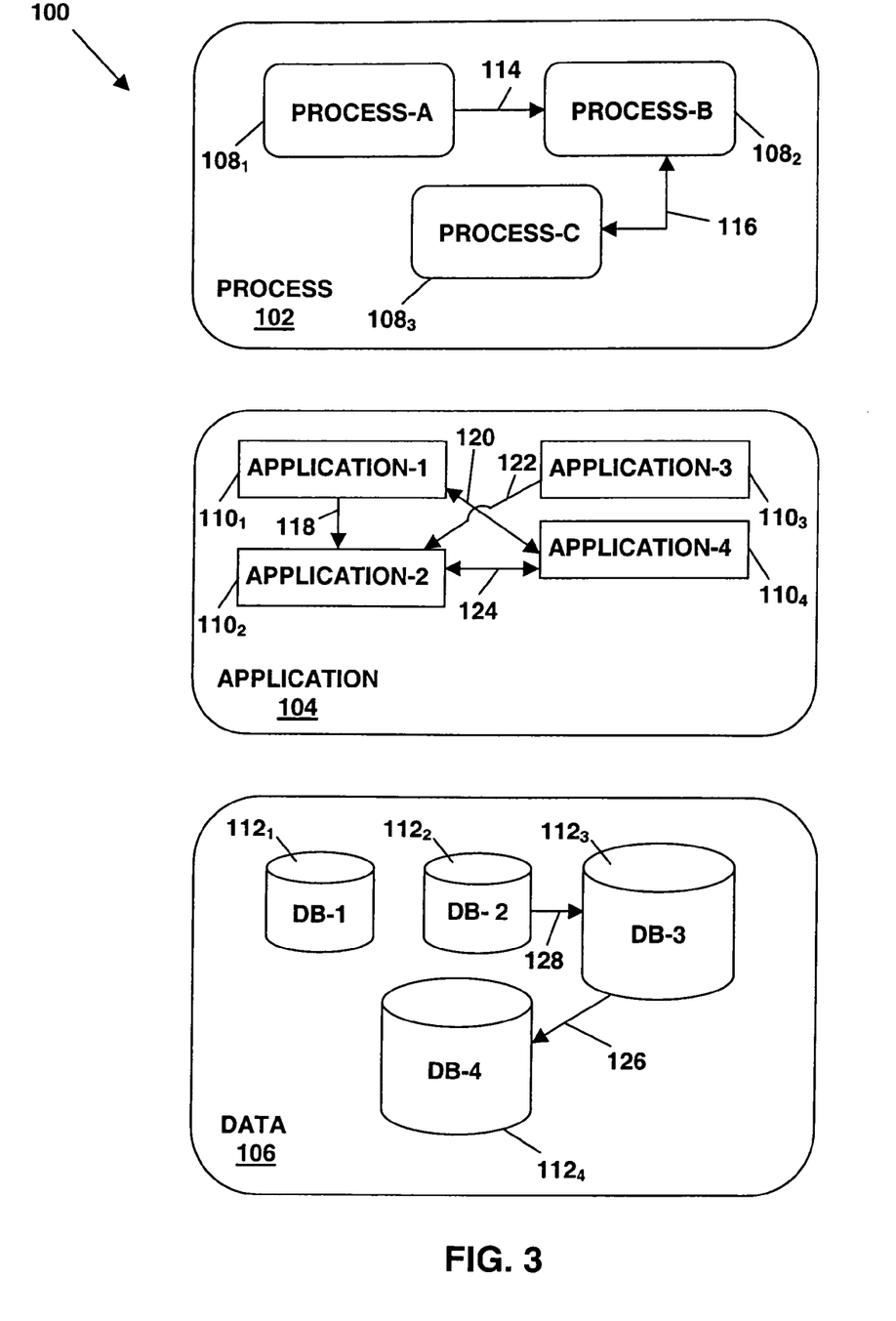
FIG. 3 depicts the defining of intra-domain relationships within the enterprise architecture of FIG. 2, in accordance with the present invention.

The intra-domain relationships defined by the user within enterprise architecture 100 are illustrated in FIG. 3. Specifically, an output of PROCESS-A $108_1$ is defined as being supplied to PROCESS-B $108_2$ as indicated by assignment symbol (e.g., directional arrow) 114, while PROCESS-B $108_2$ and PROCESS-C $108_3$ are defined as being bi-directionally coupled in some manner as indicated by assignment symbol 116. Many other types of assignment symbols are also possible. An output of APPLICATION-1 $110_1$ is provided to APPLICATION-2 $110_2$ as indicated by assignment symbol 118. APPLICATION-1 $110_1$ is also bi-directionally coupled in some manner with APPLICATION-4 $110_4$ as indicated by assignment symbol 120. APPLICATION-2 $110_2$ receives an output of APPLICATION-3 $110_3$ as indicated by assignment symbol 122, and is bi-directionally coupled in some manner to APPLICATION-4 $110_4$ as indicated by assignment symbol 124. Finally, DB-3 $112_3$ is shown as storing data in DB-4 $112_4$ as indicated by assignment symbol 126, while DB-2 $112_2$ is shown as storing data in DB-3 $112_3$ as indicated by assignment symbol 128.

Figure 4:
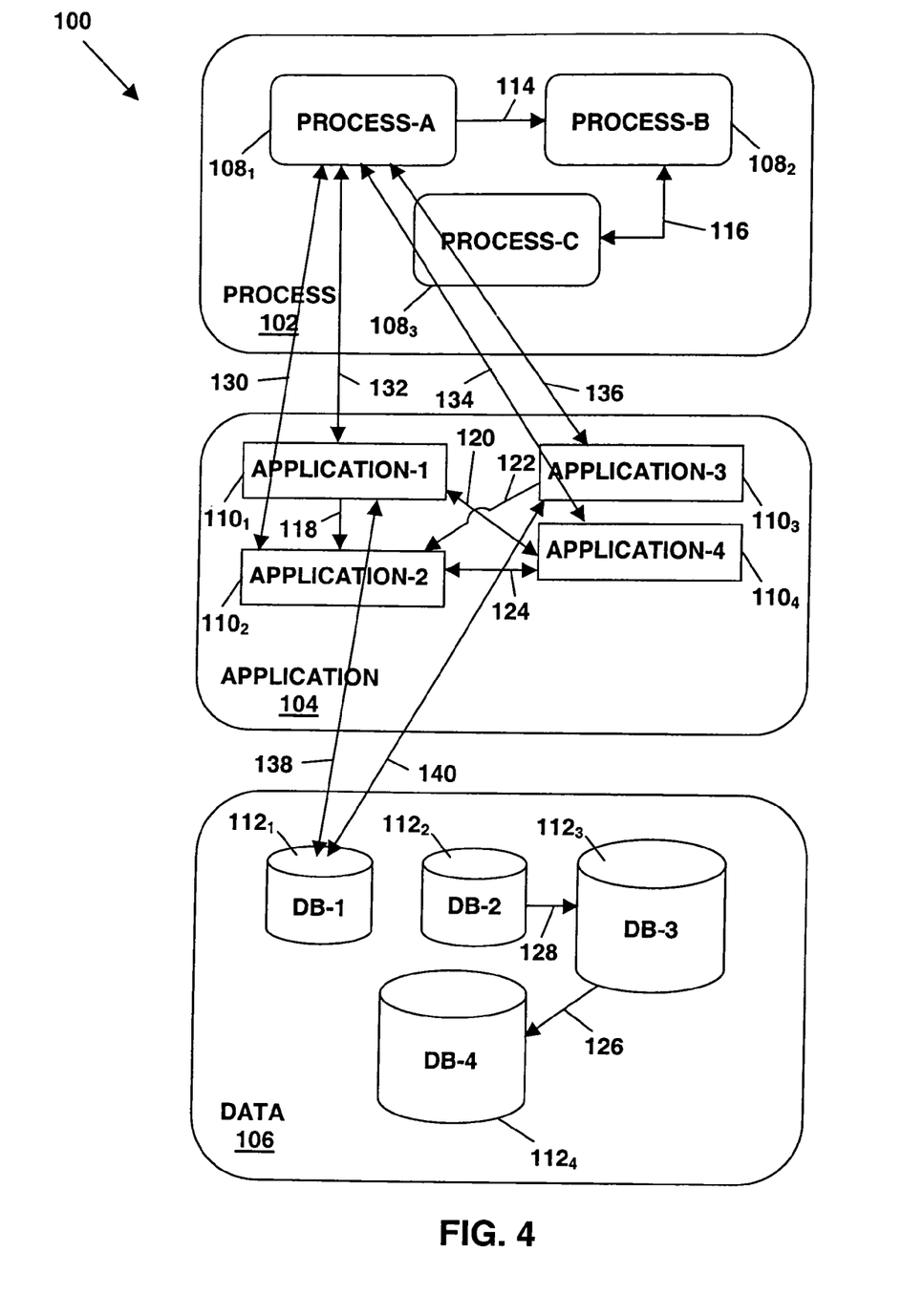
FIG. 4 depicts the defining of inter-domain relationships within the enterprise architecture of FIG. 2, in accordance with the present invention.

The inter-domain relationships defined by the user within enterprise architecture 100 are illustrated in FIG. 4. Specifically, APPLICATION-1 $110_1$, APPLICATION-2 $110_2$, APPLICATION-3 $110_3$, and APPLICATION-4 $110_4$ are defined as being bi-directionally coupled in some manner with PROCESS-A $108_1$ as indicated by assignment symbols 130, 132, 134, and 136, respectively. In addition, APPLICATION-1 $110_1$ and APPLICATION-3 $110_3$ are defined as being bi-directionally coupled in some manner with DB-1 $112_1$ as indicated by assignment symbols 138 and 140, respectively.

The modeling tool of the present invention interrogates the user regarding planned effective dates (e.g., begin and end dates) and actual effective dates (e.g., begin and end dates) for the use of an enterprise element in support of another enterprise element in the same and/or other domain(s). In the above-example, it is assumed that all of the elements in the enterprise architecture 100 are defined to have a start date (planned and actual) of Jan. 1, 2004, and that all of the elements in the enterprise architecture 100, with the exception of APPLICATION-1 $110_1$, are defined to have a planned end date of Dec. 31, 2004; APPLICATION-1 $110_1$ is defined to have a planned end date of Jun. 30, 2004.

The modeling tool of the present invention also interrogates the user regarding planned effective dates (e.g., begin and end dates) and actual effective dates (e.g., begin and end dates) for the assignments (i.e., assignment symbols) of enterprise elements to each other, both intra and inter-domain, in the enterprise architecture 100. In the above-example, it is assumed that all of the assignment symbols 114-140 in the enterprise architecture 100 are defined to have a start date (planned and actual) of Jan. 1, 2004, and that all of the assignment symbols in the enterprise architecture 100, with the exception of assignment symbols 118, 120, 124, 132, and 138, are defined to have a planned end date of Dec. 31, 2004. Because APPLICATION-1 $110_1$ is defined to have a planned end date of Jun. 30, 2004, the assignment symbols 118, 120, 124, 132, and 138 associated with APPLICATION-1 $110_1$ have a corresponding planned end date of Jun. 30, 2004 (i.e., assignment symbols 118, 120, 124, 132, and 138 are no longer valid after that date).

Figure 5:
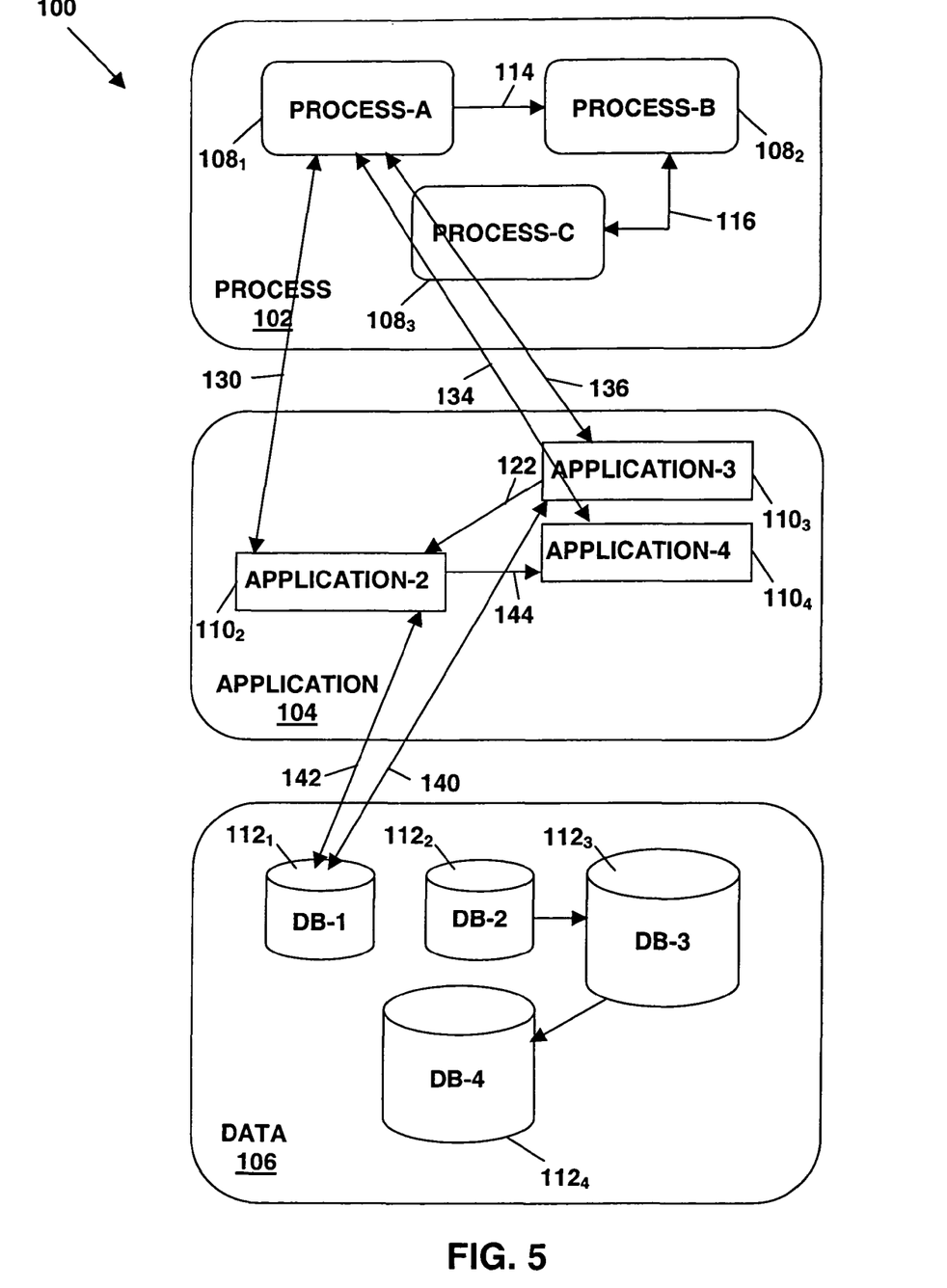
FIG. 5 depicts the changes in the enterprise architecture of FIG. 4, in response to the retirement of an application element in the APPLICATION domain.

Upon the retirement of APPLICATION-1 $110_1$ and associated assignment symbols 118, 120, 124, 132, and 138 on Jun. 30, 2004, flow within the enterprise architecture 100 changes in the manner shown in FIG. 5. In particular, APPLICATION-2 $110_2$ is now bi-directionally coupled in some manner with DB-1 $112_1$ as indicated by assignment symbol 142, and APPLICATION-2 $110_2$ is no longer bi-directionally coupled to APPLICATION-4 $110_4$. Instead, APPLICATION-4 $110_4$ now receives an output from APPLICATION-2 $110_2$ as indicated by assignment symbol 144 (APPLICATION-2 $110_2$ no longer receives an output from APPLICATION-4 $110_4$). It is assumed that assignment symbols 142 and 144 were defined with the intra and inter-domain relationships described above, and that the assignment symbols 142, 144 have a planned start date of Jul. 1, 2004 and a planned end date of Dec. 31, 2004.

The present invention provides a modeling tool for rendering state diagrams for a multi-dimensional enterprise architecture. The rendered state diagrams illustrate the actual or planned use, assignment, retirement, interdependence, etc., of enterprise elements in a multi-dimensional enterprise architecture within a user-specified time frame, from a user selected frame of reference. This is illustrated in FIGS. 6-10 in terms of the above-described enterprise architecture 100.

Figure 6:
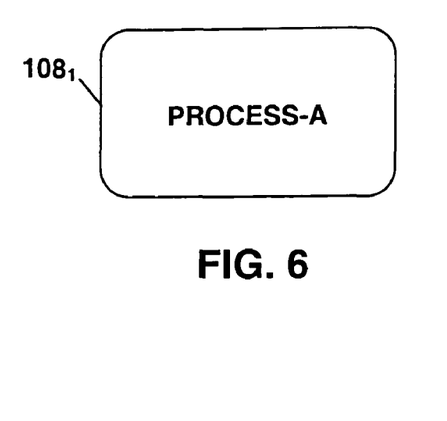
FIG. 6 depicts a reference state diagram.

In accordance with the present invention, the user selects a frame of reference (i.e. a type of reference state diagram focused on a primary element type within an enterprise architecture domain), a time frame of interest, and then, for one or more of the primary elements appearing in the initially rendered reference diagram, selects one or more related enterprise element types from other domains to layer into the initially rendered reference diagram. As shown in FIG. 6, for example, the user has selected the PROCESS domain 102 as the frame of reference focus for the reference state diagram, and has selected the process object PROCESS-A $108_1$ within the PROCESS domain 102. The user then selects one or more enterprise element types from other domains of the enterprise architecture to "layer" onto the reference state diagram. Enterprise element types available for selection are determined by the types of relationships defined by the enterprise architecture model between the primary element type (i.e. a process object in this example) and enterprise element types in the other dimensions.

The layering is represented by introducing symbols that illustrate either 1) the use of an enterprise element from another dimension (i.e., other than the dimension of the reference state diagram) into the selected objects that use them or 2) the assignment of an enterprise element from another dimension into the selected objects to which they are assigned. The objects on the reference state diagram dynamically resize to contain the "usage" and "assignment" objects and symbols. In the present example, the user has chosen to generate a state diagram based on the enterprise elements and intra and inter-domain relationships presented in FIG. 4 that are directly or indirectly associated with PROCESS-A $108_1$. This involves layering application objects APPLICATION-1 $110_1$, APPLICATION-2 $110_2$, APPLICATION-3 $110_3$, and APPLICATION-4 $110_4$ from the APPLICATION domain 104, data object DB-1 $112_1$ from the DATA domain 106, and associated assignment symbols 118-124 and 138-140, into the process object PROCESS-A $108_1$. The rendered state diagram 150 is shown in FIG. 7.

Figure 7:
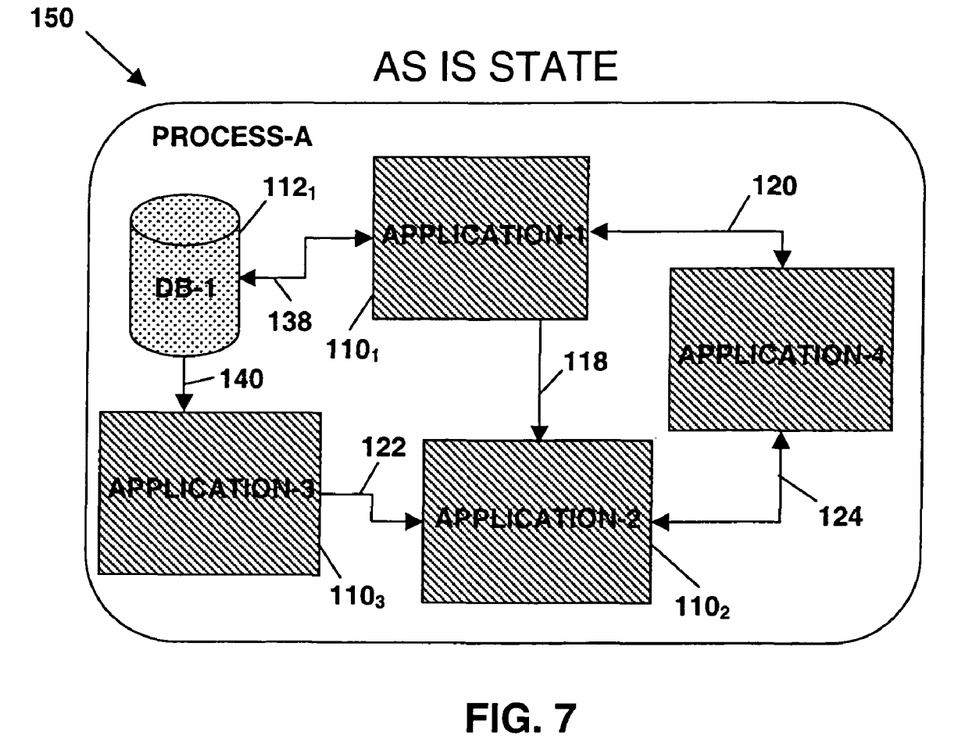
FIG. 7 depicts an "as is" multi-dimensional state diagram rendered in accordance with the present invention.

In FIG. 7, the objects associated with each domain are displayed using different shapes and colors/shading. This allows a user to easily differentiate between the various elements displayed in the state diagram 150. In general, color coding and notation conventions may be used to distinguish enterprise elements from different domains of the enterprise architecture, to distinguish between planned and actual use, and to distinguish elements, element usage, and element assignments that have effective begin or end dates that fall within a user-specified time frame from those which are effective both before and after the user-specified time frame.

Figure 8:
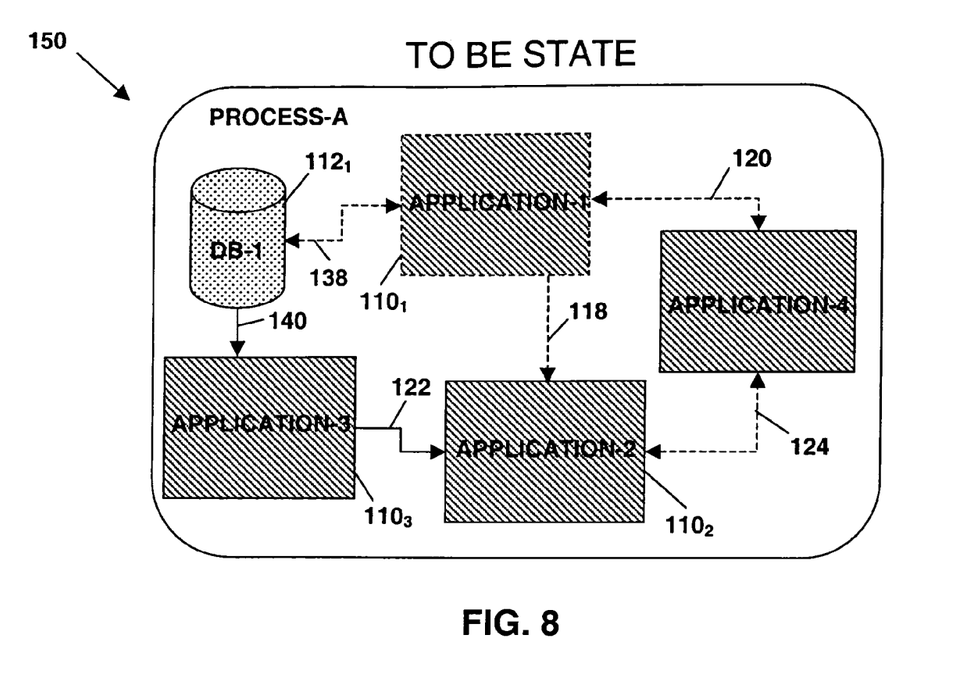
FIG. 8 depicts a "to be" multi-dimensional state diagram rendered in accordance with the present invention.

The modeling tool of the present invention provides the user with the ability to visualize time-based changes in an enterprise architecture (e.g., the removal and/or addition of enterprise elements, changes in process flow, etc.), and the impact of such changes on the various domains/elements of the enterprise architecture, from a user-specified frame of reference. For example, the removal of an application object from the APPLICATION domain 104 of enterprise architecture 100, and its resultant impact on PROCESS-A $108_1$, is illustrated in FIGS. 7-9.

FIG. 7 illustrates the As-Is-State of state diagram 150 at a first point of time selected by the user (e.g., Jan. 1, 2004). FIG. 8 illustrates the To-Be-State of the state diagram 150 at or near the retirement of APPLICATION-1 110 (e.g., at or near Jun. 30, 2004). The To-Be-State is generated by the modeling tool of the present invention based on the date-related interrogation of the user as described above. As shown in FIG. 8, APPLICATION $110_1$ and its associated assignment symbols 118, 120, and 138 are illustrated using dashed lines to indicate that these elements in the state diagram 150 are nearing retirement. In addition, assignment symbol 124 is illustrated using a dashed line because it also will be retired due to a change in data flow upon the retirement of APPLICATION-1 $110_1$. Other methods for indicating retirement of elements in the state diagram may also be used.

Figure 9:
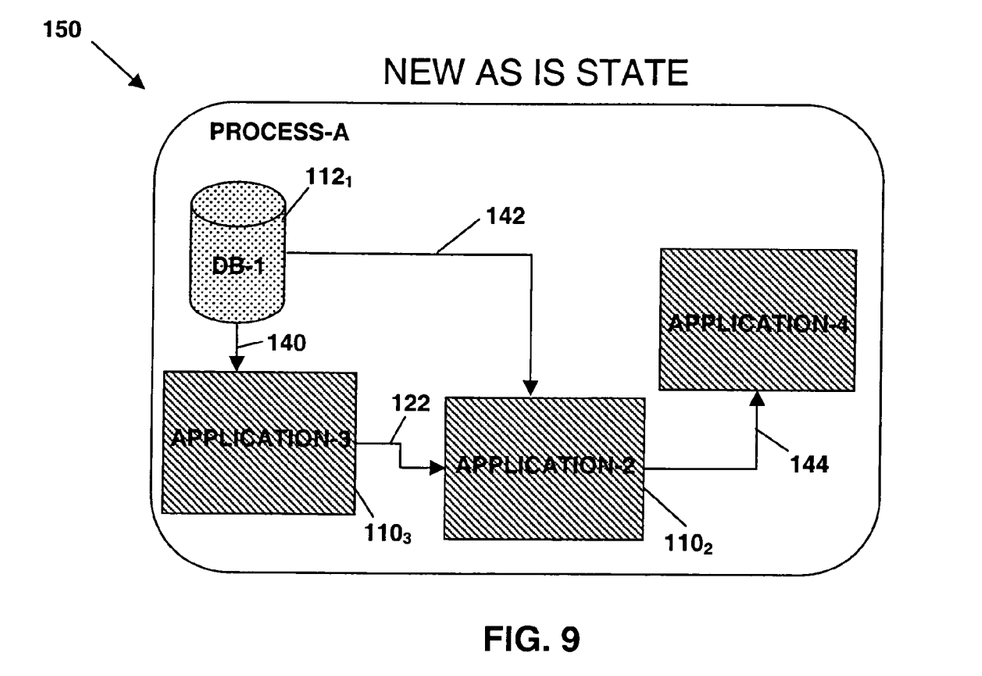
FIG. 9 depicts a new "as is" multi-dimensional state diagram rendered in accordance with the present invention.

FIG. 9 illustrates the state diagram 150 in its new As-Is-State after the retirement of APPLICATION-1 $110_1$ (e.g., after Jun. 30, 2004) and the resultant changes within the domains 102, 104, 106 of the enterprise architecture 100 that occurred in support of the removal of APPLICATION-1 $110_1$. This is done from the user-specified frame of reference of PROCESS-A $108_1$. It should be noted that during the changes depicted in FIGS. 7-9, PROCESS-A $108_1$ may have sub-level changes which accommodate and support the new flow of information as defined by APPLICATION-2 $110_2$, APPLICATION-3 $110_3$, and APPLICATION-4 $110_4$, their supporting databases, and the like. Also, it should be noted that the changes shown in this representation are illustrated in terms of three domains, and that the actual changes could affect other domains in the enterprise architecture 100.

Figure 10:
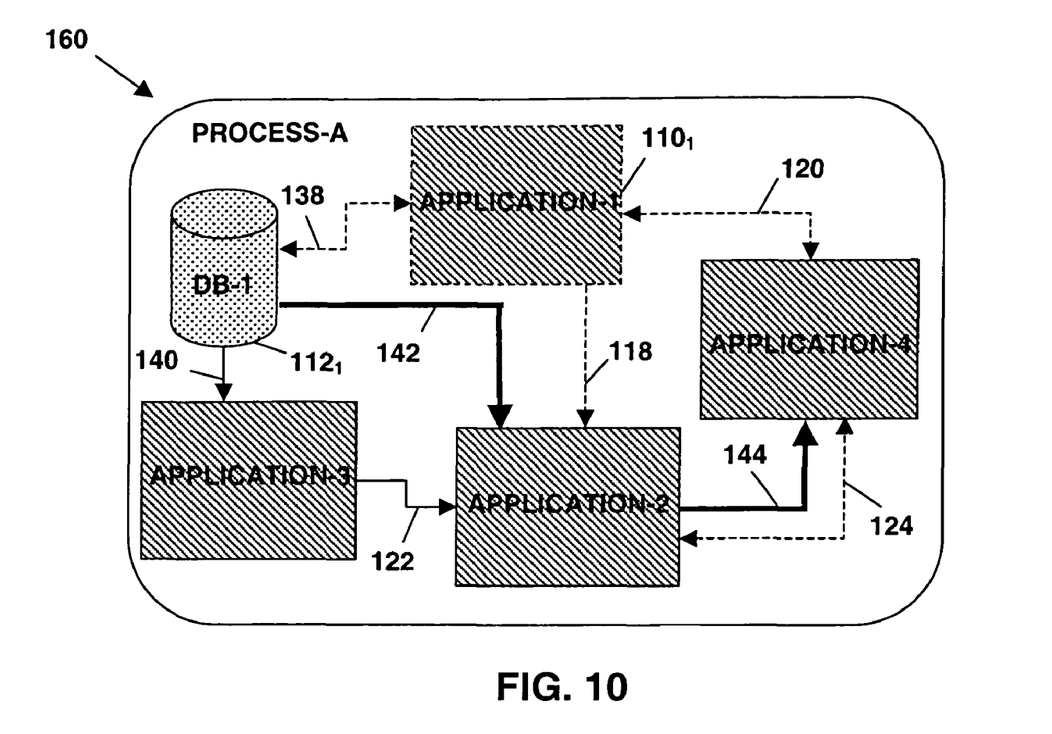
FIG. 10 depicts a multi-dimensional state diagram rendered for a range of dates.

The present invention can also be used to render a state diagram for a time frame comprising a range of time (e.g., a month, quarter, etc.). In this case, color coding and notation conventions may be used to indicate elements being installed (i.e., start date occurs within time frame), removed/sunset (i.e., end date occurs within time frame), and persistent (i.e., start date occurs before start of time frame and end date occurs after end of time frame). An example of such a state diagram 170 is illustrated in FIG. 10 for a time frame from Dec. 1, 2003 to Jan. 31, 2005. In this example, the enterprise elements that are installed/added during this time frame include assignment symbols 142 and 144, which are illustrated using thick solid lines. The enterprise elements being removed/sunset during this time frame include APPLICATION-1 $110_1$ and assignment symbols 118, 120, 124, and 138, which are illustrated using thin dashed lines. The enterprise elements that are persistent during this time frame include APPLICATION-2 $110_2$, APPLICATION-3 $110_3$, APPLICATION-4 $110_4$, DB-1 $112_1$, and assignment symbols 122 and 140, which are illustrated using thin solid lines.

Figure 11:
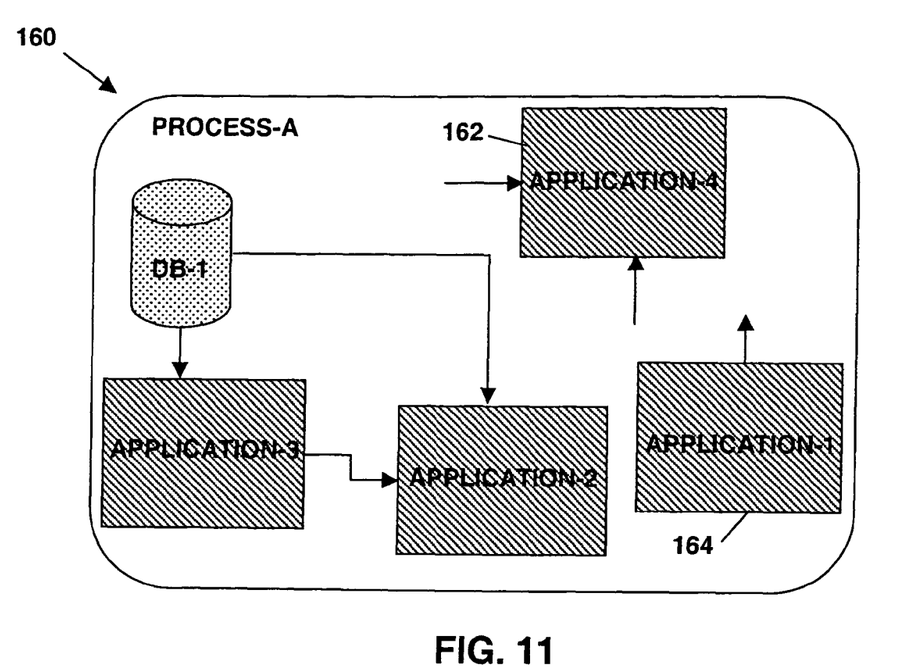
FIG. 11 depicts the detection of assignment anomalies in accordance with the present invention.

The present invention can be used to detect alignment anomalies within a state diagram, which indicate that a corresponding enterprise architecture needs to be revised/corrected. An alignment anomaly could be a "black hole" or a "miracle." A "black hole" might be an application, process, or other enterprise element that only receives inputs but does not provide any outputs to anything. A "miracle" is something that provides outputs, but receives no inputs. Such anomalies may not appear when a state diagram is viewed at a first point in time or from a first point of reference, but may appear when the same state diagram is viewed at a second point of time or from a second point of reference, respectively. FIG. 11 illustrates a state diagram 160 that includes both a "black hole" anomaly 162 and a "miracle" anomaly 164. The ability of a user, therefore, to view state diagrams illustrating enterprise elements in a multi-dimensional enterprise architecture within a user-specified time frame and from a user selected frame of reference, facilitates the detection of such anomalies.

Figure 12:
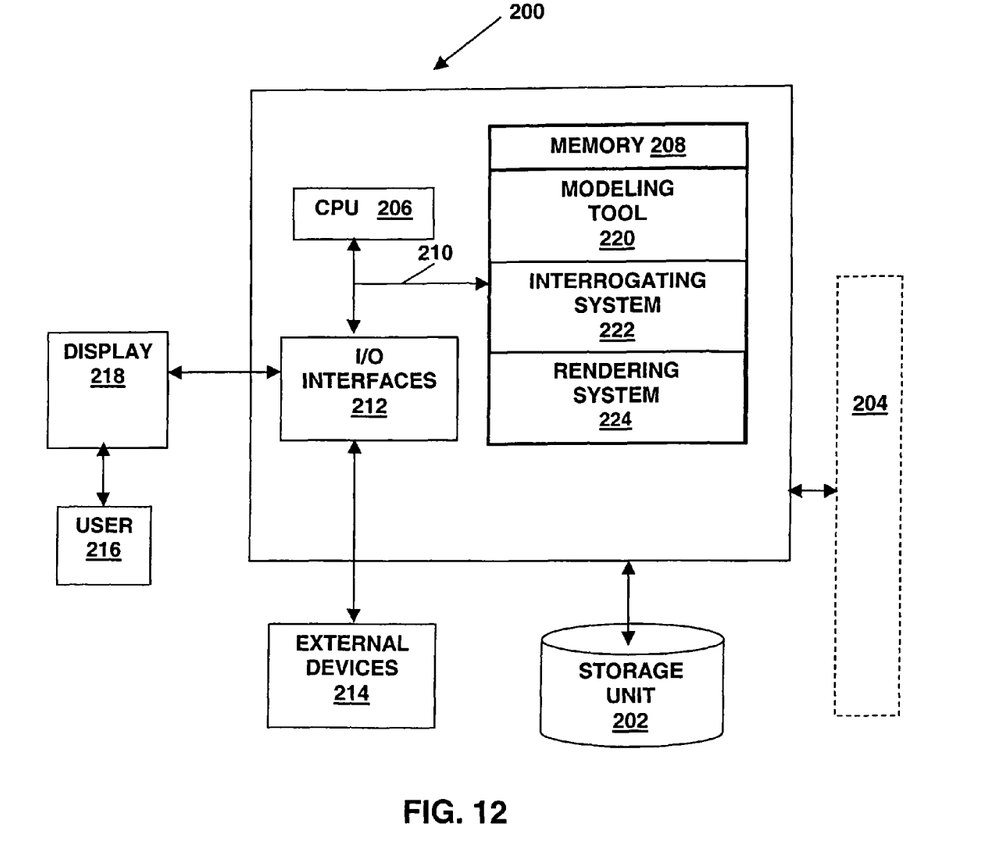
FIG. 12 depicts a computer system for carrying out the present invention.

Referring now to FIG. 12, there is illustrated a computer system 200 for rendering state diagrams for a multi-dimensional enterprise architecture in accordance with the present invention. Computer system 200 is intended to represent any type of computerized system capable of rendering the state diagrams of the present invention. For example, computer system 200 may comprises a desktop computer, laptop, workstation, server, PDA, cellular phone, pager, etc.)

Data used in the practice of the present invention may be stored locally to computer system 200 in a storage unit 202, and/or may be provided to computer system 200 over a network 204. Storage unit 202 can be any system capable of providing storage for information under the present invention. As such, storage unit 202 may reside at a single physical location, comprising one or more types of data storage, or may be distributed across a plurality of physical systems in various forms. In another embodiment, storage unit 202 may be distributed across, for example, a local area network (LAN), wide area network (WAN) or a storage area network (SAN) (not shown). Network 204 is intended to represent any type of network over which users data can be transmitted. For example, network 204 can include the Internet, a wide area network (WAN), a local area network (LAN), a virtual private network (VPN), a WiFi network, or other type of network. To this extent, communication can occur via a direct hardwired connection or via an addressable connection in a client-server (or server-server) environment that may utilize any combination of wireline and/or wireless transmission methods. In the case of the latter, the server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

As shown, computer system 200 generally includes a central processing unit (CPU) 206, memory 208, bus 210, input/output (I/O) interfaces 212 and external devices/resources 214. CPU 206 may comprise a single processing unit, or may be distributed across one or more processing units in one or more locations, e.g., on a client and server. Memory 208 may comprise any known type of data storage and/or transmission media, including magnetic media, optical media, random access memory (RAM), read-only memory (ROM), etc. Moreover, similar to CPU 206, memory 208 may reside at a single physical location, comprising one or more types of data storage, or be distributed across a plurality of physical systems in various forms.

I/O interfaces 212 may comprise any system for exchanging information to/from an external source. External devices/resources 214 may comprise any known type of external device, including speakers, a CRT, LED screen, handheld device, keyboard, mouse, voice recognition system, speech output system, printer, monitor/display, facsimile, pager, etc. In FIG. 12, for example, the rendered state diagrams are displayed to a user 216 on a monitor/display 218.

Bus 210 provides a communication link between each of the components in computer system 200, and likewise may comprise any known type of transmission link, including electrical, optical, wireless, etc. In addition, although not shown, additional components, such as cache memory, communication systems, system software, etc., may be incorporated into computer system 200.

Shown in memory 208 is a modeling tool 220 for rendering state diagrams for a multi-dimensional enterprise architecture in accordance with the present invention, based on data stored in storage unit 202. Also shown in memory 208 is an interrogating system 222 for interrogating a user in order to define the enterprise elements and domains of the enterprise architecture, and the intra and inter-domain relationships between selected enterprise elements in the domains. The interrogating system 222 also interrogates the user regarding planned effective dates and actual effective dates for the use of an enterprise element in support of another enterprise element in the same and/or other domain(s). In addition, the interrogating system 222 interrogates the user regarding planned effective dates and actual effective dates for the assignment of an enterprise element to another enterprise element in the same and/or other domain(s). The data collected by the interrogating system 222 is stored in storage unit 202. Based on user input, a rendering system 224 selectively renders state diagrams illustrating the actual or planned use, assignment, retirement, interdependence, etc., of enterprise elements in the multi-dimensional enterprise architecture within a user-specified time frame, from a user selected frame of reference, for a user-specified business scope.

It should be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A method for rendering at least one state diagram for an enterprise architecture, comprising:
    employing at least one computer device for:
    defining a plurality of objects, wherein each of the objects represents an element of the enterprise architecture;
    defining a plurality of relationships, wherein each of the relationships is between one of the plurality of objects and another of the plurality of objects;
    rendering and displaying a plurality of state diagrams for the entire enterprise architecture based upon the plurality of objects, the plurality of relationships, and a frame of reference, the rendering and displaying comprising rendering and displaying a first state diagram for the entire enterprise architecture based upon a frame of reference at a first point in time, and rendering and displaying a second state diagram for the entire enterprise architecture based upon the frame of reference at a second point of time, wherein the displayed first and second state diagrams each comprise a plurality of displayed objects and a plurality of displayed assignment elements each corresponding to a respective one of the relationships;
    re-rendering and displaying at least one of the state diagrams for the entire enterprise architecture based upon changes to at least one of the plurality of objects, at least one of the plurality of relationships, or the frame of reference; and
    detecting alignment anomalies within at least one of the displayed state diagrams based on the displayed assignment elements, the alignment anomalies comprising at least one of the objects that is displayed as: receiving an input from another object, but not providing an output to any other object, or providing an output to another object, but not receiving an input from any other object.

2. The method of claim 1, wherein the frame of reference comprises a domain in the enterprise architecture.

3. The method of claim 2, wherein the domain is selected from the group consisting of:
    strategy, organization, operations, data, application, technology, infrastructure, and process.

4. The method of claim 1, wherein the frame of reference comprises a domain in the enterprise architecture.

5. The method of claim 4, wherein the domain is selected from the group consisting of:
    strategy, organization, operations, data, application, technology, infrastructure, and process.

6. The method of claim 1, further comprising:
    defining effective dates for each of the plurality of objects.

7. The method of claim 6, wherein the effective dates comprise a start date and an end date.

8. The method of claim 1, further comprising:
    defining effective dates for each of the plurality of relationships.

9. The method of claim 8, wherein the effective dates comprise a start date and an end date.

10. The method of claim 1, wherein the rendering comprises:
    rendering a state diagram for the entire enterprise architecture based upon a frame of reference for a range of time.

11. A system for rendering at least one state diagram for an enterprise architecture, comprising:
    at least one computing device, including:
    a system for defining a plurality of objects, wherein each of the objects represents an element of the enterprise architecture;
    a system for defining a plurality of relationships, wherein each of the relationships is between one of the plurality of objects and another of the plurality of objects;
    a system for rendering and displaying a plurality of state diagrams for the entire enterprise architecture based upon the plurality of objects, the plurality of relationships, and a frame of reference, the rendering and displaying comprising rendering and displaying a first state diagram for the entire enterprise architecture based upon a frame of reference at a first point in time, and rendering and displaying a second state diagram for the entire enterprise architecture based upon the frame of reference at a second point of time, wherein the displayed first and second state diagrams each comprise a plurality of displayed objects and a plurality of displayed assignment elements each corresponding to a respective one of the relationships;
    a system for re-rendering and displaying at least one of the state diagrams for the entire enterprise architecture based upon changes to at least one of the plurality of objects, at least one of the plurality of relationships, or the frame of reference; and a system for detecting alignment anomalies within at least one of the displayed state diagrams based on the displayed assignment elements, the alignment anomalies comprising at least one of the objects that is displayed as: receiving an input from another object, but not providing an output to any other object, or providing an output to another object, but not receiving an input from any other object.

12. The system of claim 11, wherein the frame of reference comprises a domain in the enterprise architecture.

13. The system of claim 11, further comprising:
defining effective dates for each of the plurality of objects and relationships.

14. The system of claim 13, wherein the effective dates comprise a start date and an end date.

15. The system of claim 11, wherein the system for rendering renders a state diagram for the entire enterprise architecture based upon a frame of reference for a range of time.

16. A program product stored on a recordable storage medium, which when executed on a computer, renders at least one state diagram for an enterprise architecture, the program product causing the computer to perform a method comprising:
defining a plurality of objects, wherein each of the objects represents an element of the enterprise architecture;
defining a plurality of relationships, wherein each of the relationships is between one of the plurality of objects and another of the plurality of objects;
rendering and displaying a plurality of state diagrams for the entire enterprise architecture based upon the plurality of objects, the plurality of relationships, and a frame of reference, the rendering and displaying comprising rendering and displaying a first state diagram for the entire enterprise architecture based upon a frame of reference at a first point in time, and rendering and displaying a second state diagram for the entire enterprise architecture based upon the frame of reference at a second point of time, wherein the displayed first and second state diagrams each comprise a plurality of displayed objects and a plurality of displayed assignment elements each corresponding to a respective one of the relationships;
re-rendering and displaying at least one of the state diagrams for the entire enterprise architecture based upon changes to at least one of the plurality of objects, at least one of the plurality of relationships, or the frame of reference; and
detecting alignment anomalies within at least one of the displayed state diagrams based on the displayed assignment elements, the alignment anomalies comprising at least one of the objects that is displayed as: receiving an input from another object, but not providing an output to any other object, or providing an output to another object, but not receiving an input from any other object.

17. The program product of claim 16, wherein the frame of reference comprises a domain in the enterprise architecture.

18. The program product of claim 17, wherein the domain is selected from the group consisting of strategy, organization, operations, data, application, technology, infrastructure, and process.

19. The program product of claim 16, wherein the frame of reference comprises a domain in the enterprise architecture.

20. The program product of claim 19, wherein the domain is selected from the group consisting of: strategy, organization, operations, data, application, technology, infrastructure, and process.

21. The program product of claim 16, the method further comprising:
defining effective dates for each of the plurality of objects.

22. The program product of claim 21, wherein the effective dates comprise a start date and an end date.

23. The program product of claim 16, the method further comprising:
defining effective dates for each of the plurality of relationships.

24. The program product of claim 23, wherein the effective dates comprise a start date and an end date.

25. The program product of claim 16, wherein the program code for rendering renders a state diagram for the entire enterprise architecture based upon a frame of reference for a range of time.

* * * * *